(12) United States Patent
Niedermaier et al.

(10) Patent No.: US 9,344,843 B2
(45) Date of Patent: May 17, 2016

(54) PROVIDING CONTEXT SENSITIVE SERVICE BUNDLES

(71) Applicants: Arnold Niedermaier, Karlsruhe-Durlach (DE); Barbara Fluegge, Arbon (DE)

(72) Inventors: Arnold Niedermaier, Karlsruhe-Durlach (DE); Barbara Fluegge, Arbon (DE)

(73) Assignee: SAP SE, Walldorf, DE (US)

( * ) Notice: Subject to any disclaimer, the term of this patent is extended or adjusted under 35 U.S.C. 154(b) by 0 days.

(21) Appl. No.: 14/517,459

(22) Filed: Oct. 17, 2014

(65) Prior Publication Data
US 2016/0112831 A1    Apr. 21, 2016

(51) Int. Cl.
H04W 24/00    (2009.01)
H04W 4/02    (2009.01)
H04W 4/00    (2009.01)

(52) U.S. Cl.
CPC .............. *H04W 4/02* (2013.01); *H04W 4/003* (2013.01)

(58) Field of Classification Search
CPC ....... H04W 4/02; H04W 4/023; H04W 64/00; H04W 4/206
See application file for complete search history.

(56) References Cited

U.S. PATENT DOCUMENTS

| | | | |
|---|---|---|---|
| 6,986,145 B2 | 1/2006 | Gangopadhyay | |
| 7,475,123 B2 | 1/2009 | Schwarze | |
| 7,831,982 B2 | 11/2010 | Smirnov et al. | |
| 7,912,902 B2 | 3/2011 | Cheng et al. | |
| 7,950,015 B2 | 5/2011 | Das et al. | |
| 8,645,181 B2 | 2/2014 | Lehmann et al. | |
| 8,707,261 B2 | 4/2014 | Heller et al. | |
| 2007/0287423 A1* | 12/2007 | Kakiuchi | G06Q 20/32 455/411 |
| 2009/0248828 A1* | 10/2009 | Gould | G08B 27/005 709/207 |
| 2012/0115505 A1* | 5/2012 | Miyake | G06Q 10/06 455/456.1 |
| 2012/0158821 A1 | 6/2012 | Barros | |
| 2012/0221384 A1 | 8/2012 | Avadhanam et al. | |
| 2012/0258736 A1* | 10/2012 | Gupta | H04W 4/02 455/456.3 |
| 2012/0324069 A1 | 12/2012 | Nori et al. | |
| 2013/0091452 A1* | 4/2013 | Sorden | H04W 4/02 715/771 |
| 2013/0132854 A1* | 5/2013 | Raleigh | G06F 3/0482 715/738 |
| 2013/0159897 A1 | 6/2013 | Misovski et al. | |
| 2013/0254024 A1 | 9/2013 | Woods et al. | |
| 2014/0129389 A1 | 5/2014 | Patel et al. | |

OTHER PUBLICATIONS

Harry Bouwman et al., "Barriers and Drivers in the Adoption of Current and Future Mobile Services in Finland," Journal Telematics and Informatics, vol. 24, Issue 2, pp. 145-160, May 2007.

Swaroop Kalasapur, et al., "Dynamic Service Composition in Pervasive Computing," IEEE Transactions on Parallel and Distributed Systems, vol. 18, No. 7, pp. 907-918, Jul. 2007.

* cited by examiner

*Primary Examiner* — Khalid Shaheed
(74) *Attorney, Agent, or Firm* — Fountainhead Law Group PC

(57) ABSTRACT

Technical solutions for providing context sensitive service bundles are provided. In some implementations, a method includes identifying location information associated with a user. The location information identifies a first location area. The method further includes, in accordance with (1) a first determination that a first service is available within a predefined proximity to the first location area; (2) a second determination that the second service is also available within predefined proximity to the first location area; and (3) a third determination that the first service relates to the second service to a predefined degree; using a single application, causing a service bundle to be offered to the user by: causing the first service and the second service to be concurrently offered to the user in the single application.

18 Claims, 8 Drawing Sheets

PROVIDING CONTEXT SENSITIVE SERVICE BUNDLES

BACKGROUND

Enabling simultaneous access to several related items of interest (e.g., goods or service) is important. For example, a tourist visiting a new city may find it convenient to use his/her cell phone to not only look for local attractions, but also at the same time search and pay for parking meters.

Difficulties abound, however. Accessing different services using a mobile device often requires several different applications. Each of these several different applications needs to be individually searched, downloaded, installed, configured, and executed—a quite cumbersome process. In the above example, a tourist may need a map app for discovering tourist attractions, and a separate parking app for search and paying parking meters.

There is therefore a need for improved techniques to provide context sensitive service bundles.

Hard-coded, fixed service bundles are no option any more, as new services are released on daily basis and existing services are changed, replaced by newer once or even discontinued. Hence a flexible service bundle is required, where a service provider can easily add new services and replace existing ones.

DETAILED DESCRIPTION

Figure 1:
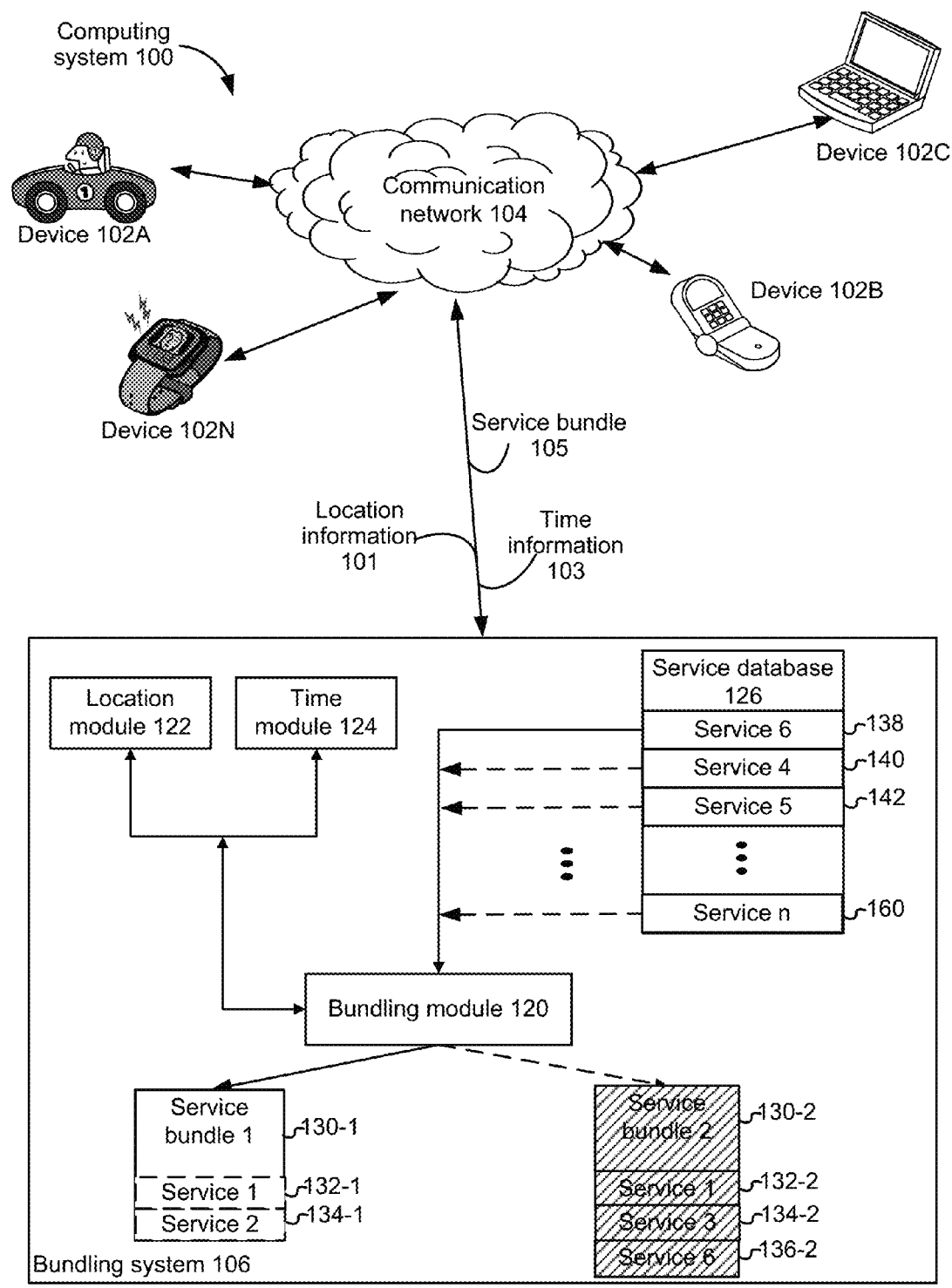
FIGS. 1-2 are example block diagrams illustrating various computing systems for providing context sensitive service bundles, in accordance with some implementations.

The implementations described herein provide various technical solutions to provide context sensitive service bundles, and in particular to the above-identified technical problems—by enabling, within a single application (also call an app), access to different services, thereby reducing or eliminating the burden on a user to look for, download, install, configure, and execute several different applications.

As a non-limiting example, after identifying a user's current location as within the city of San Mateo, Calif., 94403 US (e.g., via a GPS device on the user's phone or cell tower triangulation techniques), a service bundling system selects one or more services available within a predefined distance from the user (e.g., with consideration to the user's speed of movement, by bicycle, by car, or by foot). In some cases, the bundling system also selects available service in accordance with the user's current local time, e.g., to determine whether a particular service is available at that time (e.g., a church service might not be available at 1 am on a Wednesday). In some case, a service's availability is defined using both geo-fences (the geographical area covered by the zip code 94403) and time requirements (e.g., open from 9 am to 6 pm, Monday through Friday, except holidays).

Next, based on the location and time requirements, the bundling system selects several different kinds of services (e.g., a museum, a doctor's office, and a parking-for-a-fee lot near the museum). In some cases, based on the relatedness (or lack thereof) among these different kinds of services, the bundling system selectively identifies two (or more) related services (e.g., the museum and the parking service) and offer them as a service bundle to the user.

Furthermore, the two related services are enabled in a single mobile application (e.g., an IPHONE app or an ANDROID app). For example, a user can buy a museum tickets and prepay for a 2-hour parking at a nearby parking lot all within the same application.

These techniques are advantageous. First, applications on mobile devices (e.g., such as an IPHONE app) are often designed to access a particular service—and only that particular service. For example, a parking app enables a user to only pay for parking; a baseball app enables a user to only buy MLB tickets; and a restaurant reservation app enables a user to only make restaurant reservations. Therefore, a user who is driving to a baseball game and dinning at a nearby French restaurant may need to download the baseball app (for buying game tickets), the parking app (for paying for parking), and the restaurant reservation app (for making dinner reservations)—a quite burdensome process.

Second, offering related service based on a user's current location and current time increases the chance that the offered services are of interest to the user. For example, after determining that a user is in a rural town at 1 am on a Monday, gas stations and fast food restaurant (1) within a 1-mile radius (e.g., a location requirement) and (2) currently open (e.g., a time requirement) are included into a service bundle. Because in many situations (e.g., during a Friday night out, a weekend getaway, or a cross-country trip), a user is more likely interested in services that are currently available (e.g., a late night hamburger, a gas fill up, and a motel reservation), rather than those that are not available until sometime in the future, such as in couple of days or weeks (e.g., buying an airline ticket for traveling a year from now).

By these ways, service bundles including related services that are currently available are provided to a user; and access to relevant service (e.g., in terms of both time and location) can therefore be improved.

Allowing mobile and desktop users to find the "right" set of service offerings: right set is defined as a service offering distilling user preferences and pre-settings.

Leveraging offerings in an easy-to-consume manner through a rigorous registration process that captures relevant master data, secures settings and preferences, and allows the user to configure per location the service suggestions.

Additional details of implementations are now described in relation to the figures.

FIG. 1 is an example block diagram illustrating a computing system for providing context sensitive service bundles, in accordance with some implementations.

In some implementations, the computing system 100 includes one or more computing devices 102 (e.g., 102-A, 102-B, . . . , and 102-N), a communication network 104, a bundling system 106.

In some implementations, a computing device 102 enables a user to interact with the bundling system 106, e.g., accessing/consuming services from a service bundle provided by the bundling system 106. In some implementations, the computing device 102 is a mobile computing device, such as a laptop computer, a notebook computer, a smart phone, a smart watch, a smart vehicle, a GPS device, or a tablet computer. In some implementations, the computing device 102 is equipped with a location device (e.g., a GPS component) and a time device, which provide current location and time (or approximations thereof) to the bundling system 106.

In some implementations, the computing device 102 hosts several mobile applications (e.g., IPHONE apps or ANDROID apps). In some implementations, the computing device 102 hosts a mobile application (e.g., an IPHONE app or an ANDROID app) that is capable of enabling a user to access multiple services. For example, in some cases, a smart watch user can (by clicking a single button) execute a single application, which sends the user's current location and time to the bundling system 106. In some implementations, the bundling system then, based on the fact that the user is driving slowly at 5 am in downtown Manhattan (New York City, N.Y.), determines that the user may be looking for a parking garage and a breakfast spot. Accordingly, the bundling system makes these services (prepay parking at a discounted rate and put in an online order for breakfast) available in the single application on the user's smart watch. To purchase these services, the user can pay using credit card information stored in his/her user or device profile. By these ways, a user can access several related service without having to download, install, and configure numerous application onto the smart watch.

In some implementations, the communication network 104 interconnects one or more computing devices 102 with each other, and with the bundling system (e.g., a server) 106. In some implementations, the communication network 104 optionally includes the Internet, one or more local area networks (LANs), one or more wide area networks (WANs), other types of networks, or a combination of such networks.

In some implementations, the bundling system 106 includes a bundling module 120, a location module 122, a time module 124, and a service database 126. In some implementations, the bundling module 120 selectively bundles two or more different types of services as a service bundle to a user of a computing device 102. In some implementations, the location module 122 identifies a computing device 102 user's current location (an approximation thereof). In some implementations, the location module 122 also manages a computing device 102 user's past locations or a history thereof, e.g., so as to determine a user profile for the user, e.g., whether the user a food enthusiast because he or she frequents bars and fine dining restaurants, or whether the user is a business traveler, because he or she constantly takes cross-country air trips.

In some implementations, the time module 124 identifies current time (or an approximation thereof) of a computing device 102. In some implementations, the current time includes one of: time, date, month, and year.

In some implementations, the service database 126 manages and stores a group of different types of services 130, 140, 142, . . . , 160 (e.g., restaurant, parking, museum, gas station) and their associated availabilities (location and time). For example, a restaurant service is identified by its name, location, open time, and food time. In some implementations, the service database 126 manages and stores a group of different types of services (e.g., restaurant, parking, museum, gas station) and their associated availabilities (location and time).

In some implementations, the bundling system provides two or more service bundles to a user, such as service bundles 130-1 and 130-2. In some implementations, the service bundle 130-2 is provided as a backup option to the service bundle 130-1.

In some implementations, as a backup option, the service bundle 130-2 (e.g., parking and movie tickets) is not made available to a user, until the user has chosen (e.g., expressly or implicitly) not to use a service provided in the service bundle 130-1 (e.g., restaurant reservation and movie tickets). In some implementations, a backup service bundle replaces a current service bundle, responsive to a determination that the backup service bundle is more relevant. For example, upon detecting that a user has walked past by—without entering—a restaurant of which a reservation service was offered (which suggests a lack of user interest in the reservation service), a backup service bundle (e.g., a sandwich coupon and a free DVD rental code) replaces the first service bundle (e.g., the restaurant reservation and a discounted movie ticket).

In some implementations, the backup option is used to provide a premium service bundle, as opposed to a standard service bundle. Premium service bundle usually offers more services or higher quality than standard service bundle. One example could be parking slot reservation rather than only parking place information.

These techniques are advantageous, as they allow bundled service to be dynamically selected based on a user's recent actions, which are indicative of present user interest (or lack thereof). For example, a user standing still in front of a restaurant (as indicated by a lack of movement measured using a GPS device) may indicate that the user is considering dinning at the restaurant; so a bundled service including a no-wait-time check-in service and a discounted ticket for a movie about 1.5 hours after the current time (so as to allow the user amble dinner time) may be offered. For another example, for a user's wandering in a downtown dinning district, quickly walking past by several fine-dining restaurants may indicate a present lack of interest in fine-dining and a potential interest in fast food; in this case, a service bundle for a discounted burger meal and a coupon for eating at a nearby PIZZAHUT restaurant may be provided.

In some implementations, as a backup service bundle, the bundle 130-2 (e.g., parking and discounted movie tickets) is not made available to a user, until the user has decided not to use a service provided in the service bundle 130-1 (e.g., restaurant reservation and movie tickets). In some implementations, a service bundle includes more than 2 different types of services (e.g., services provided by different service industries), e.g., the service bundle 130-2 includes the service 132-2 (e.g., a haircut), the service 134-2 (e.g., a dinning service), and the service 136-2 (e.g., a limousine service).

In some implementations, a user of the computing device 102 registers in the bundling system 106 one or more service preferences. For example, a user who rarely dines outside home may turn off the option for recommending restaurant-related services; a user who prefers fine-dining over fast food may opt out for any fast food related services; and a user who prefers DVD or BLUERAY rentals over watching live events (e.g., concerts or sports) can register for DVD rental coupons and stop receiving movie ticket discounts.

Figure 2:
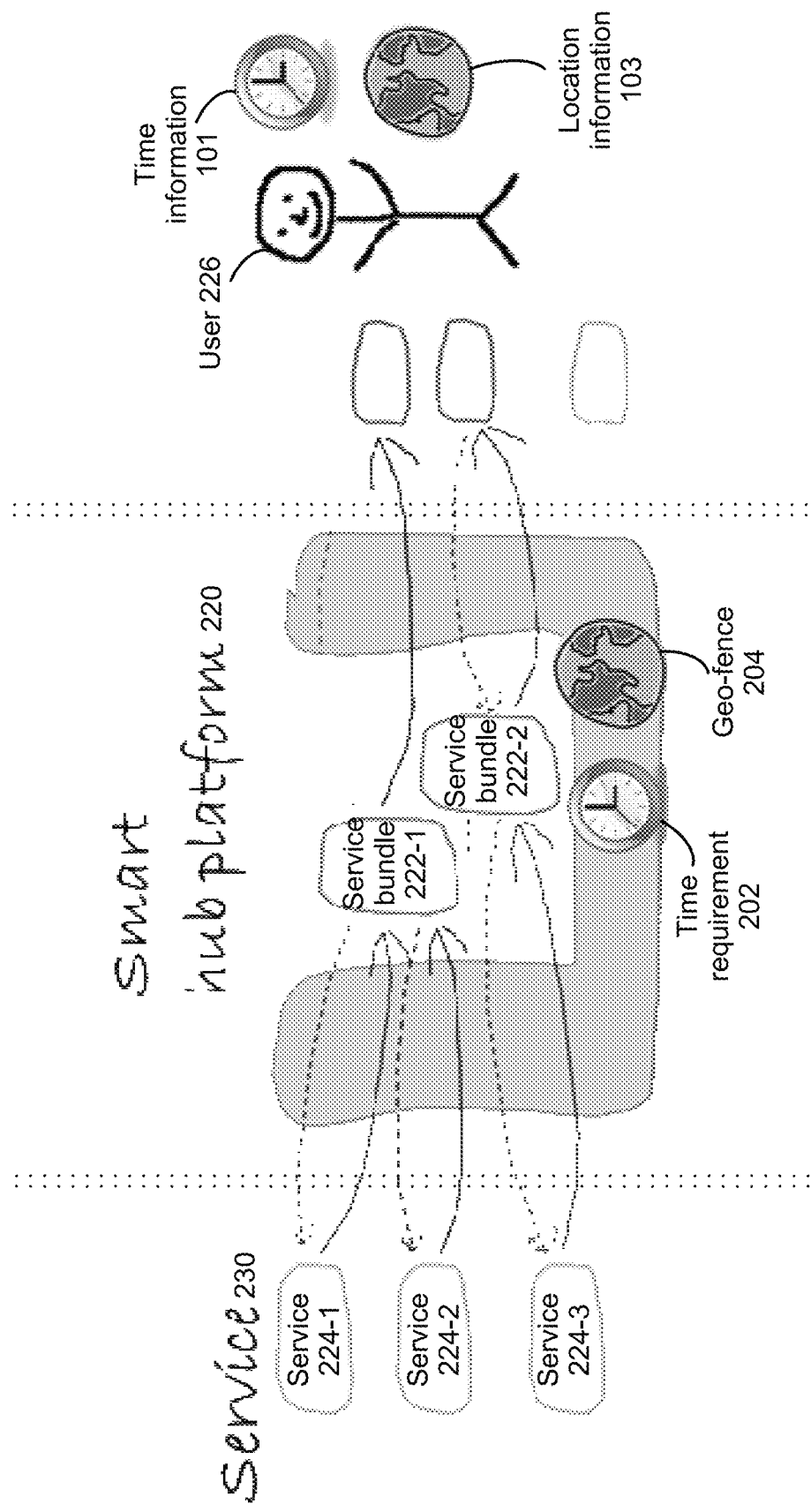

FIG. 2 is an example block diagrams illustrating various computing systems for providing context sensitive service bundles, in accordance with some implementations.

In some implementations, the bundling system 106 (shown in FIG. 1) is implemented as part of a smart hub platform 220, which gathers time information 101 and location information 103 from a mobile computing device 102 and identifies service bundles in accordance therewith. For example, when a user's current location is within a predefined distance from a gen-fence defined for a service 224-1, the smart hub platform 220 offers the service 224-1 to the user 226 as part of a service bundle 222-1.

In some implementations, service providers (e.g., restaurant owners, movie theaters, rental agents, business owners, gas stations) registers their services (e.g., 224-1, 224-2, and 224-3) with the smart hub platform 220, so as to make their services accessible to a user.

In some implementations, a service provider defines location availability and time availability for a service, using geo-fences and time requirements. For example, a sport bar owner can define geo-fences for their restraint to include users working at nearby companies and time requirements to offer dinners (e.g., between 6 pm and 9 pm).

In some implementations, a service provider can modify (e.g., redefine) time and location requirement for their services, so as to accommodate fluctuating user needs.

In some implementations, the smart hub platform 220 provides registered services to a user, so as to avoid offering services that may be irrelevant or inappropriate to a user. For example, a discounted alcoholic drink voucher is offered only to users of legal drinking age, and an R-rate movie ticket is provided only to user of appropriate age groups.

Figure 3:
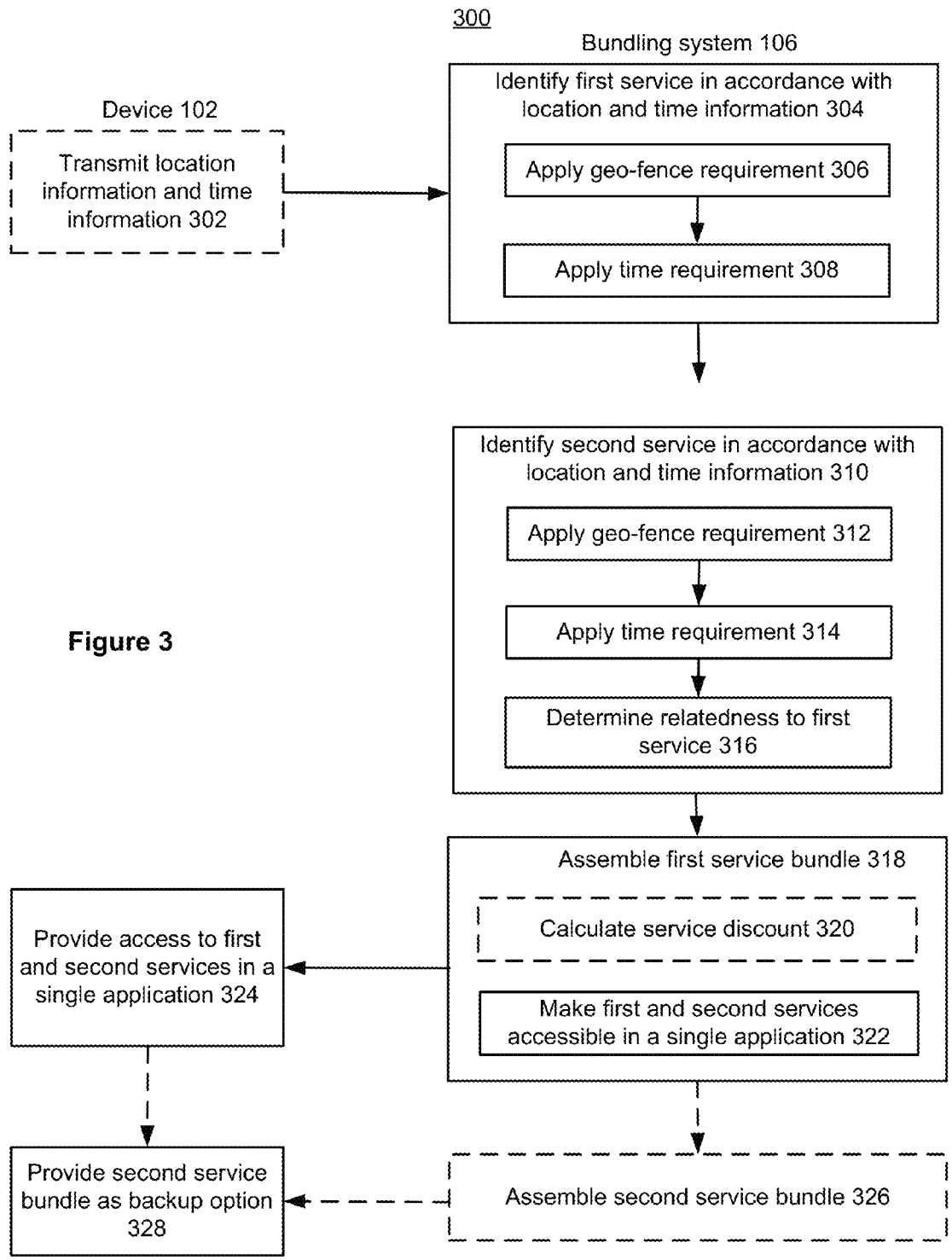
FIGS. 3-4 are example flow charts illustrating various methods for providing context sensitive service bundles, in accordance with some implementations.

FIG. 3 is an example flow charts illustrating a method 300 for providing context sensitive service bundles, in accordance with some implementations.

In some implementations, the method 300 is implemented at a bundling system 106.

In some implementations, upon detecting a trigger event (e.g., a user's current location is within a predefined proximity to a geo-fence), the mobile device 102 transmits (302) location information (e.g., its current location or an approximation thereto) and time information (e.g., its current time or an approximation thereto) to the bundling system 106.

In some implementations, responsive to receiving the location information (e.g., a user's current location or an approximation thereof) and the time information (e.g., its current time or an approximation thereto) from the mobile device 102, the bundling system 106 identifies (304) a first service (e.g., from the service database 126) in accordance with the location and time information.

In some implementations, identifying (304) the first service in accordance with the location and time information includes applying (306) a geo-fence requirement and applying (306) a time requirement. For example, the first service (e.g., to be incorporated in to a service bundle) is identified using the current time and current location of the mobile device (which corresponds to a user's current time and location, under the assumption that the user is within a predefined proximity to the mobile device (e.g., carrying the mobile device on his/her person). For another example, upon detecting that a user is at a San Francisco downtown movie theater (e.g., current location) at 3 pm (e.g., current time) on a Friday (e.g., current day), a discounted movie voucher (e.g., the first service) is selected.

In some implementations, the geo-fence requirement specifies a geographical area (e.g., the area covered by the zip code 94403) in which a service is offered as part of a service bundle to a user. In some implementations, a service is not geographically located in the area specified by a geo-fence requirement associated therewith. For example, a reservation service at a fine-dining restaurant (outside a geo-fence) is offered for a user visiting a modern art museum (within the geo fence), because a fine-dining restaurant owner may assume that some cases modern art enthusiasts are likely to enjoy fine-dining.

In some implementations, after identifying the first service, the bundling system 106 identifies (310) a second service in accordance with the time and location information.

In some implementations, identifying the second service includes applying (312) a geo-fence requirement, applying (314) a time requirement, and determining (316) relatedness between the first service and second service. To continue with the above example, upon detecting that the user is at a San Francisco downtown movie theater (current location) at 3 pm (current time) on a Friday, a dinning reservation service (the second service) is selected. The dinning reservation service is selected partly because it relates to the discounted movie voucher, because it may be assumed that, on a late Friday afternoon, the user is likely to watch a movie and have a dinner nearby. These techniques are advantageous: from service providers' perspective, related services (e.g., movie and dinner reservation) are likely to be consumed by a user together, thereby rendering a service bundle appear more appealing than a mere combination of unrelated services (e.g., museum and dry clean, hot dog and oil change, pizza and discounted tire change); and from a user's prospective, a bundle of related services may be more useful and convenient.

In some implementations, identifying the first and second services, the bundling system 106 assembles (318) the first service bundle to include the first and second services (with or without modifications). For one example, particular reservation slots are offered (e.g., 5:30-6:00 pm) in view of the movie schedules (e.g., 6:30 pm), e.g., so as to provide packaged service and thus added convenience to a user. For another example, the bundling system may determine parameters associated with a service in a bundle based on another service in the bundle, so as to avoid offering conflicting (e.g., mutually exclusive, a 6:00 pm baseball game and a 6:30 pm restaurant reservation) options, e.g., a dinning reservation from 6:30 pm to 8:00 pm, a movie from 8:20 pm to 10 pm, and a late night club admission from 10:30 to 2:00 am the next day.

In some implementations, assembling the first service bundle optionally includes calculating (320) service discount. For example, after identifying a restaurant reservation as the first service and a discount movie ticket as the second service, the bundling system offers a monetary discount for purchasing these services together.

In some implementations, assembling the first service bundle optionally includes making (322) the first and second services accessible in a single mobile application (e.g., an IPHONE app). For example, a user can user a single IPHONE app to not only purchase a discounted movie ticket, but also make a reservation at a nearby restaurant. These techniques are advantageous, because enabling a user access to multiple services within a single application avoids requiring the user to download and install multiple applications.

In some implementations, after receiving the first service bundle, the mobile device 102 provides (324) to the first and second services to a user in a single application.

In some implementations, after assembling the first service bundle, the bundling system 106 optionally assembles (326) a second service bundle, e.g., as a backup option.

In some implementations, after receiving the second service bundle, the mobile device 102 provides (328) to the second service bundle to the user as a backup option.

Figure 4:
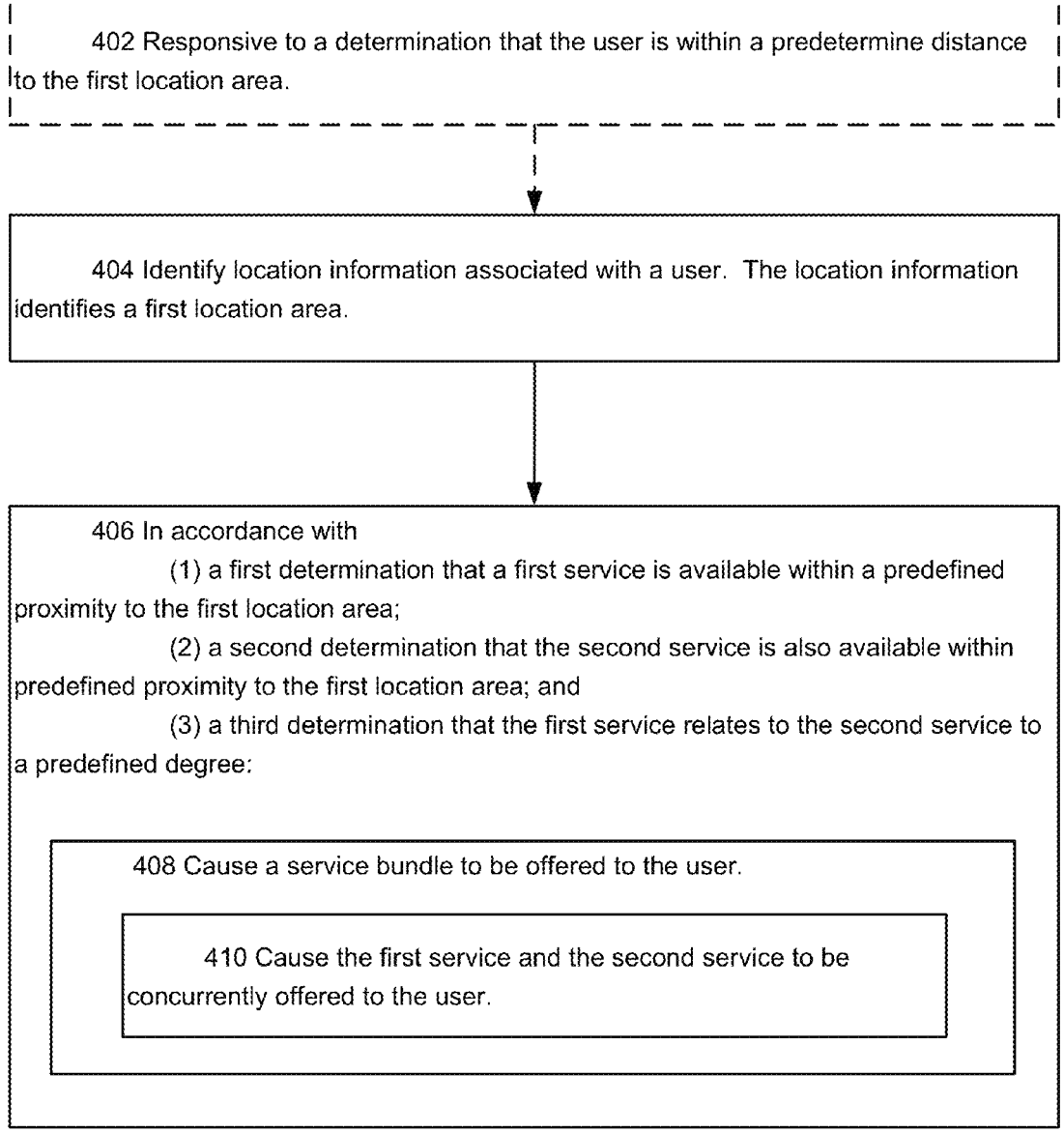

FIG. 4 is an example flow chart illustrating a method 400 for providing context sensitive service bundles, in accordance with some implementations.

In some implementations, the method 400 is implemented at a computing device having one or more processors and memory storing one or more programs for execution by the one or more processors.

Figure 5:
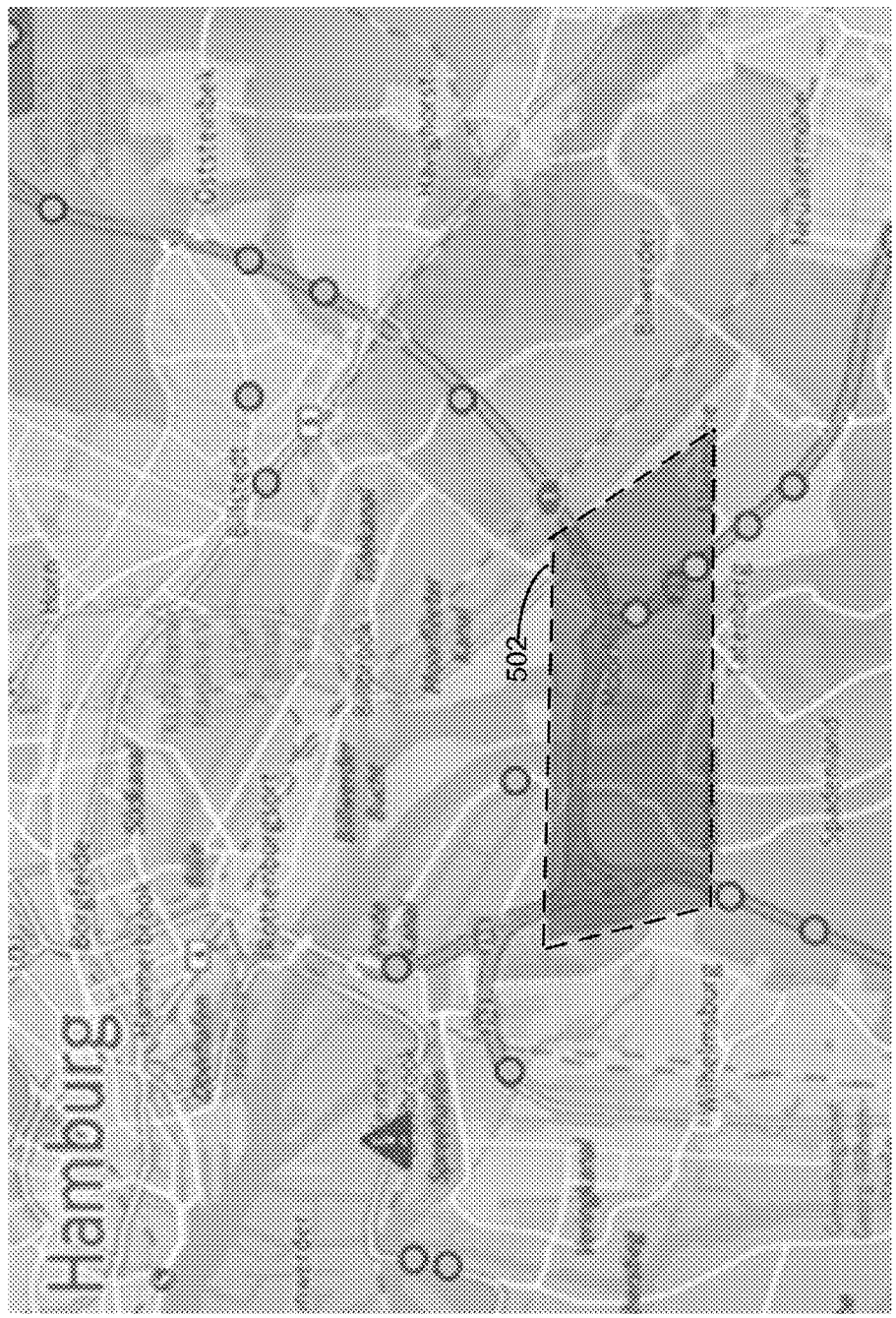
FIG. 5 is an example block diagram illustrating a geo-fence for providing context sensitive service bundles, in accordance with some implementations.

In some implementations, the method 400 is executed, responsive to (402) a determination that a user is within a predetermine distance (e.g., proximity) to the first location area. For example, a service bundle is provided when a user enters (e.g., walks into) an area specified by a geo-fence (as shown in FIG. 5). This is advantageous, as providing services that are readily available (e.g., a carry-out meal available for pick up in the next 10 minutes, or a cafe within a 1-minute walking distance) to a user (e.g., a student walking on campus looking for a lunch spot) may be more appealing than providing those that are less readily available (e.g., a dinner reservation for the next day, or within a 1-hour driving distance).

In some implementations, the method 400 includes identifying (404) location information associated with a user. The location information identifies a first location area. For example, the bundling system 106 uses GPS data collected from a smart phone to determine a user's current location. In some cases, a user's current location is determined or approximated using cell tower triangulation techniques.

In some implementations, in accordance with (1) a first determination that a first service is available within a predefined proximity to the first location area; (2) a second determination that the second service is also available within predefined proximity to the first location area; and (3) a third determination that the first service relates to the second service to a predefined degree (406); the bundling system 106 causes (408) a service bundle to be offered to the user by: causing (410) the first service and the second service to be concurrently offered to the user.

For example, after determining a user's current location, the bundle system selects a dinning reservation service (e.g., the first service) within walking distance within the user's current location. The bundle system then selects a discounted movie ticket for admission at an also nearby theater (e.g., the second service). The discounted movie ticket is selected due to its potential relatedness (e.g., geographical proximity) to the dinning reservation service, because in some cases (e.g., a Friday night out) a user often dines at a restaurant and then goes to watch a movie at a nearby theater.

In some implementations, the first service and the second service include two different types of services (e.g., provided by providers in different service industries). For example, the first service is a discounted food voucher, and the second service is a discounted movie ticket.

In some implementations, the method 400 is executed where the user is travelling at a predefined speed from an origin location to a destination location. For example, the method 400 is triggered when a user is moving at 5 miles an hour (as opposed to standstill). As another example, the method is triggered when a user is moving at 55 miles an hour (e.g., travelling by car), e.g., so as to provide travel related service bundles (e.g., gas and fast food).

In some implementations, the service bundle is preconfigured to include the first service and the second service. For example, a service bundle is selected when individual services included in the bundle meets the location and time requirements. In other words, a service bundle is offered to a user as a whole, when each individual service in the bundle meets the time and location requirement.

In some implementations, the service bundle is selected after the first service and the second service are selected. For example, a service bundle is dynamically generated (e.g., assembled) based on individually services selected in accordance with the location and time requirements.

In some implementations, the computing device is a mobile computing device, e.g., an APPLE IPHONE, IPAD or IWATCH device, a GOOGLE ANDROID device, or a SAMSUNG smart watch.

In some implementations, the service bundle is offered to the user, without user intervention, responsive to identifying the location information associated with the user. In some cases, upon detecting a user has entered a specific geographic area (e.g., a trigger event), a service bundle is generated and provided to the user. These techniques do not require a user to turn on an app in order to receive service bundles.

In some implementations, the service bundle is offered to the user within a single user application. In some implementations, the first service and the second service are accessible within the single user application. For example, the first service and the second service are provided in a single IPHONE app, thereby without requiring download and/or install of multiple apps.

In some cases, companies and public institutions tend to complement their current products and standard services (e.g., in person service) by mobile services. For example, individual (and hence separated) services for different aspects are offered, e.g., a parking app for prepay parking meters nearby a city hall and a reservation app for making appointments with a city attorney. In some cases, however, these approaches do not meet the user expectations, due to their burdensomeness. As an example, a city government may offer one IPHONE app to look for local museums, another app for reviewing local restaurants, another app for paying back taxes, and still another app for paying parking meters within the city. Therefore, a mobile app providing bundled services can resolve these technical problems. These techniques are advantageous for service providers (e.g., small municipalities) and users alike (e.g., a smart car driver, a smart watch user, and a smart phone user).

In some implementations, the method 400 further comprises: identifying information representing current time, and wherein the first service and the second service are selected based on the current time. For example, besides the geographical proximity requirement discussed above, the first and second services are also selected based on time requirements, e.g., whether the first and second services are currently available or in a predefined future time window.

In some implementations, the first service is selected in accordance with a service history associated with the user. For example, a history of services previously selected by a user may be used to provide future services in a service bundle. For instant, if a user has chosen fast food services 5 time in the past month, the next service bundle may again include a fast food service (as opposed to a fine-dining service).

In some implementations, a user register for one or more categories of services of interest, which can be included as part of a service bundle. For example, a user explicitly registers for fast food service bundle rather than fine-dining service bundle. This is advantageous, as not every available service fits a user's need. For service providers or platform provider's perspective, user registration also provides a basis for charging the user for provide relevant service bundles. In some implementations, the first service is selected in accordance with a subscription plan associated with the user. For example, when a user has subscriptions (e.g., paid or otherwise) service preferences, e.g., with the smart hub platform 220 (in FIG. 2), services provided in a service bundle are selected using the registered preferences. For example, if a user has a preferred status (e.g., through paid subscriptions) with a particular car rental company, rental services from that particular rental company (as opposed other providers) are given priority for inclusion in a service bundle.

In some implementations, the first service is selected in accordance with a preference associated with the user. For example, when a user has registered service preferences, e.g., with the smart hub platform 220 (in FIG. 2), services provided in a service bundle are selected using the registered preferences.

In some implementations, the method further includes: responsive to a predefined user action: causing a second service bundle to be offered to the user by: causing a third service and a fourth service to be concurrently offered to the user. For example, when a user has expressed a lack of interest in an existing service bundle, a backup service bundle including a third service and a fourth service is then provided.

In some implementations, the first service is provided by a first service provider, and the second service is provided by a second provider distinct from the first provider. For example, services in a service bundle are provided by different service providers, so as to diversify services provided in a service bundle.

In some implementations, the first service is available in a first geo-fence area, and the second service is provided in a second geo-fence area distinct from the first geo-fence area. For example, a service bundle includes services in a particular location sequence. For example, upon detecting (e.g., using GPS data) that a user is travelling north on the interstate highway 95 from Washington D.C., to New York, N.Y., the bundling system provides a discounted dinning voucher (e.g., the first service) at a first rest stop (south from New York, N.Y.) and a reservation for parking (e.g., the second service) near the Time Square in New York, N.Y., as part of a service bundle.

In some implementations, the first service is provided for (e.g., available within) a first time period, and the second service is provided for (e.g., available within) a second time period distinct from (e.g., different from, before, or after) the first time period. For example, a service bundle includes services in a particular time sequence. For example, a service bundle may include a restaurant reservation at 5:30 pm on a Friday night, and a ticket for a 7:30 pm movie on the same day; and for another example, paying a parking meter from 8:00 am to 10:00 am, and a discounted museum admission.

FIG. 5 is an example block diagram illustrating a geo-fence 502 for providing context sensitive service bundles, in accordance with some implementations.

For example, in some cases, a geo-fence defines a geographical area in which a service is available to a user (e.g., as part of a service bundle). In some cases, a geo-fence is defined (e.g., by a service provider, such as a restaurant, a movie theater, a gas station) using a predefined set of boundaries, e.g., neighborhood or city boundaries, zoning boundaries (e.g., downtown commercial district), or school districts. In other cases, a geo-fence is dynamically generated, e.g., a radius around a store or point location.

In some implementations, a geo-fence is employed to select location specific services, selectively provide them as service bundles, and makes one or more service bundles access on a user's mobile devices.

Figure 6:
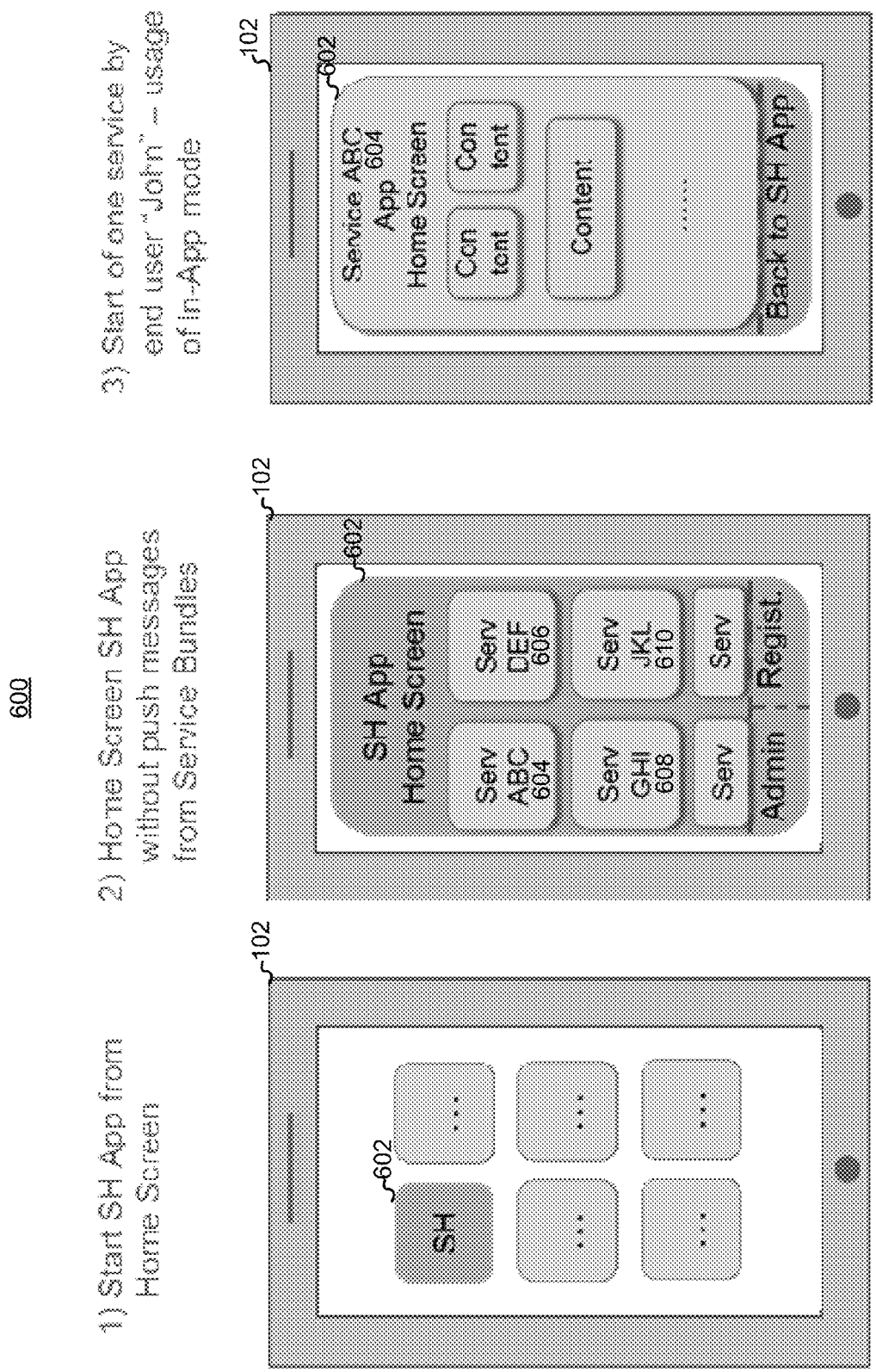
FIGS. 6-7 are example user interfaces for providing context sensitive service bundles, in accordance with some implementations.

FIG. 6 is an example user interfaces for providing context sensitive service bundles, in accordance with some implementations.

As shown in FIG. 6, in some cases, a service bundle 604 is provided within a single application (e.g., an app) 602 on a mobile device 102. As shown in FIG. 6, both the service ABC 604 (e.g., a parking service) and the service DEF 606 (e.g., a discounted movie ticket) are enabled in the SH App 602. In some case, services within a particular bundle is enabled in a predefined order (e.g., sequence), for example, a reservation at a particular restaurant is to be made first before a discounted parking can be purchased. In some case, services within a particular bundle can be accessed regardless of order, for example, an admission to a city museum restaurant can be purchased before or after prepaying a city parking meter. As shown in FIG. 6, in some cases, a service bundle is provided passively, e.g., when a user opens the app that provides service bundles.

Figure 7:
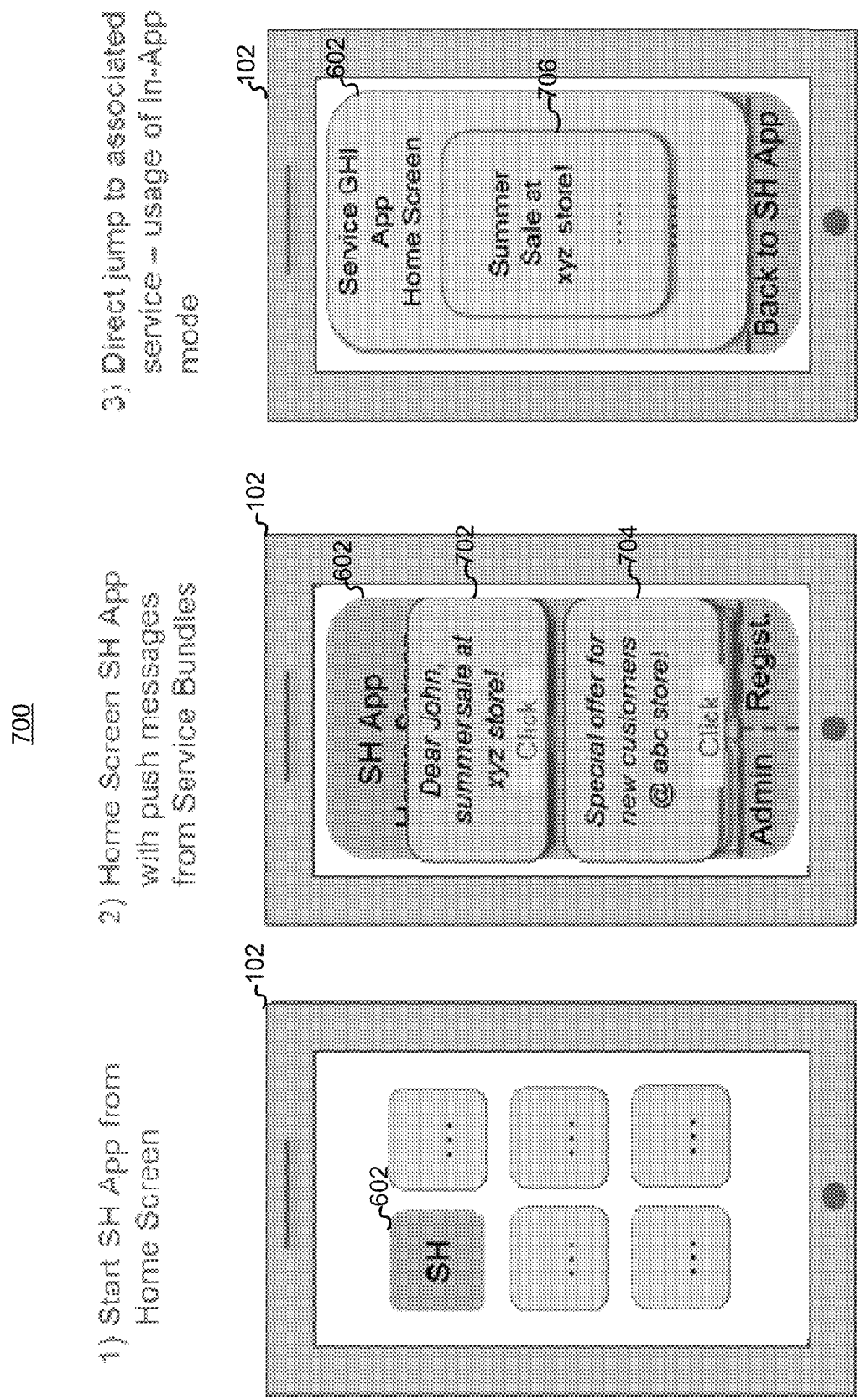

FIG. 7 is an example user interfaces for providing context sensitive service bundles, in accordance with some implementations.

As shown in FIG. 7, both the service 702 and the service 704 are enabled in the SH App 602. As shown in FIG. 7, in some cases, a service bundle is provided proactively, e.g., regardless a user the bundling app in the foreground or not. For example, in some cases, a service bundle is made aware (e.g., notified) to a user via push notifications (e.g., push messages). For example, when a user is driving from a college campus into a downtown area, a push notification is provided on the screen of the user's GPS device or smart watch. Once selected by the user, the push notification is replaced by a service bundle including a dinning discount (service 1) and driving directions (service 2) from the user current location is provided.

In some implementations, a push notification (e.g., a push message) is provided for each service in a service bundle. As shown in FIG. 7, a push notification 702 is provided for a sale at the xyz store (service 1, e.g., a discounted haircut) and a separate push notification 704 is provided for a different sale at the abc store (e.g., a 5 off coupon for an online sale of summer clothing). As shown in FIG. 7, in some cases, by selecting a push notification, a user can directly access a service provided, e.g., the user can access the online sale within the application.

Figure 8:
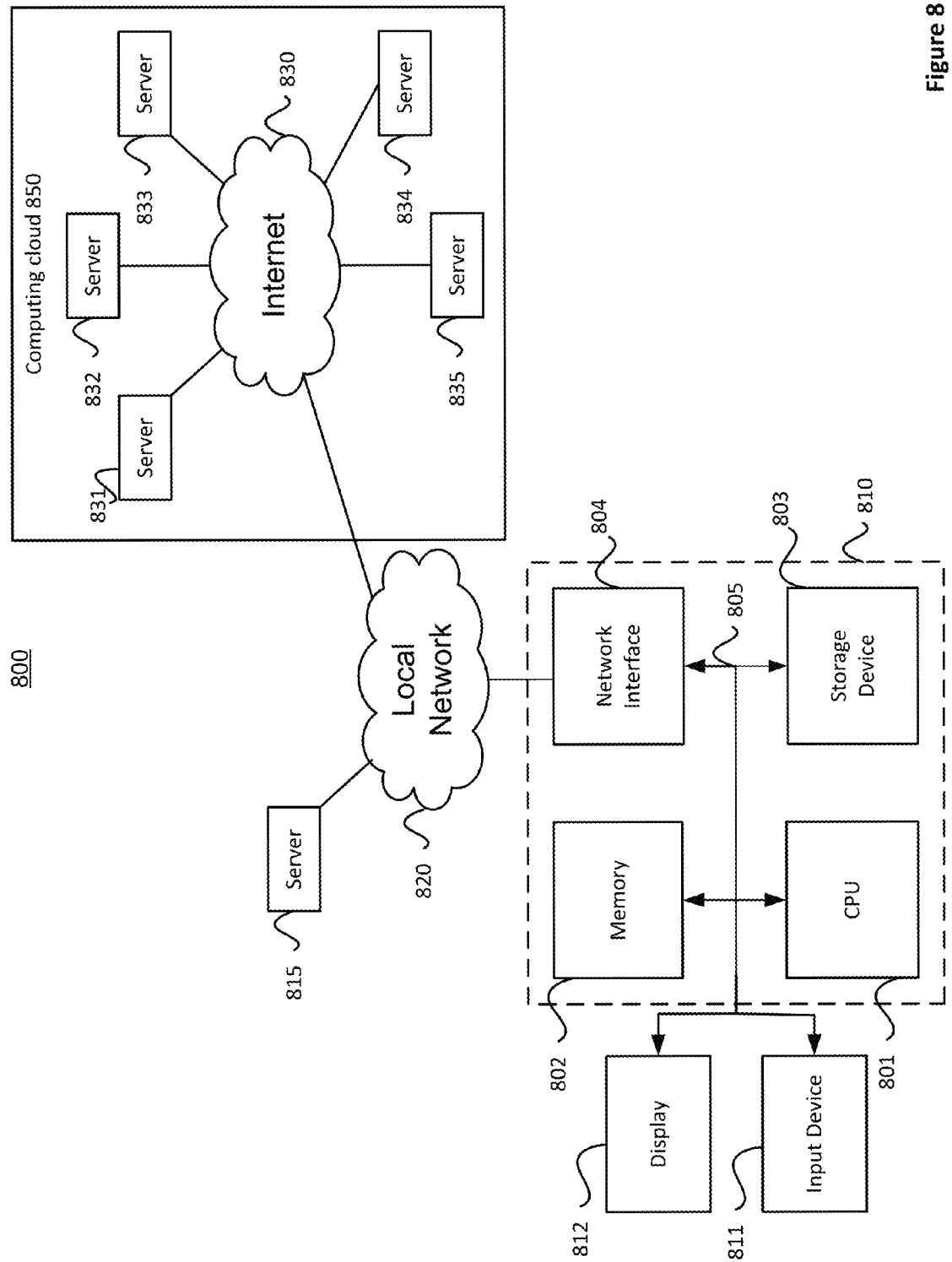
FIG. 8 is an example block diagram illustrating an example computing system for providing context sensitive service bundles, in accordance with some implementations.

FIG. 8 is an example block diagram illustrating an example computing system for providing context sensitive service bundles, in accordance with some implementations.

As shown in FIG. 8, in some implementations, the computing system 810 includes a bus 805 or other communication mechanism for communicating information, and a processor 801 coupled with the bus 805 for processing information. In some implementations, the computing system 810 also includes a memory 802 coupled to bus 805 for storing information and instructions to be executed by processor 801, including information and instructions for performing the techniques described above, for example. In some implementations, the memory 802 may also be used for storing variables or other intermediate information during execution of instructions to be executed by processor 801. In some implementations, the memory 802 includes, but is not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computing system can obtain information. In some implementations, the storage device 803 may include source code, binary code, or software files for performing the techniques above, for example. The storage device 803 and the memory 802 are both examples of computer readable mediums.

In some implementations, the computing system 810 may be coupled via the bus 805 to a display 812, such as a cathode ray tube (CRT) or liquid crystal display (LCD), for displaying information to a user. An input device 811 such as a keyboard and/or mouse is coupled to the bus 805 for communicating information and command selections from the user to the processor 801. The combination of these components allows the user to communicate with the computing system 810. In some systems, the bus 805 may be divided into multiple specialized buses.

In some implementations, the computing system 810 includes a network interface 804 coupled with the bus 805. In some implementations, the network interface 804 provides two-way data communications between the computing system 810 and the local network 820. In some implementations, the network interface 804 includes a digital subscriber line (DSL) or a modem to provide data communication connection over a telephone line, for example. Another example of the network interface 804 is a local area network (LAN) card to provide a data communication connection to a compatible LAN. Wireless links are another example. In any such implementation, the network interface 804 sends and receives electrical, electromagnetic, or optical signals that carry digital data streams representing various types of information.

In some implementations, the computing system 810 sends and receives information, including messages or other interface actions, through the network interface 804 across a local network 820, an Intranet, or the Internet 830. In some implementations, the local network, the computing system 810 communicates with a plurality of other computer machines, such as a server 815 or a computing cloud 850. In some implementations, the computing system 810 and server computer systems represented by the server 815 form a cloud computing network, which may be programmed with processes described herein. In the Internet example, software components or services may reside on multiple different computing systems 810 or servers 831-835 across the network. In some implementations, the processes described above are implemented at computing cloud 850, which includes one or more servers from the servers 831-835. In some implementations, the server 831 transmits actions or messages from one component, through the Internet 830, the local network 820, and the network interface 804 to a component of the computing system 810. In some implementations, the software components and processes described above are implemented on any computer system and send and/or receive information across a network.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first service could be termed a second service, and, similarly, a second set could be termed a first service, without changing the meaning of the description, so long as all occurrences of the "first service" are renamed consistently and all occurrences of the "second service" are renamed consistently. The first set and the second set are both services, but they are not the service.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
   at a computing device having one or more processors and memory storing one or more programs for execution by the one or more processors:
   storing in the memory a plurality of services provided by a plurality of service providers, wherein:
   each service provider provides one or more services to customers at a physical establishment or location;

each service provider predefines a geo-fence area comprising a set of boundaries encompassing its physical establishment or location for offering its services; and each service provider defines a time availability for offering its services;

identifying location information associated with a mobile device of a user, the location information comprising a location of the mobile device;

identifying information representing a current time;

detecting, based on the location of the mobile device, movement of the user into a location within a first geo-fence area, and in accordance with (1) a first determination that a first service corresponds to a first physical location within a predefined proximity to the first geo-fence area, (2) a second determination that a second service corresponds to a second physical location within the predefined proximity to the first geo-fence area, (3) a third determination that the first service relates to the second service to a predefined degree, and (4) a fourth determination that the first service and the second service are available based on the information representing the current time;

using a single application, causing a service bundle to be offered to the user in response to the first, second, third and fourth determinations by causing the first service and the second service to be concurrently offered to the user in the single application;

detecting, based on the location of the mobile device, user movement away from the first geo-fence area; and replacing the service bundle with a backup service bundle comprising at least a third service corresponding to a third physical location within a predetermined proximity to a second geo-fence area, wherein at least one of the first or second services is replaced in the backup service bundle.

2. The method of claim 1, wherein the first service and the second service are two different types of services.

3. The method of claim 1 wherein causing the service bundle to be offered to the user is further based on determining the user is travelling at a predefined speed from an origin location to a destination location.

4. The method of claim 1, wherein the service bundle is preconfigured to include the first service and the second service.

5. The method of claim 1, wherein the service bundle is selected after the first service and the second service are selected.

6. The method of claim 1, wherein the backup service bundle comprises a premium service bundle that offers higher quality services than a standard service bundle.

7. The method of claim 1, wherein the first service and second are accessible to the user without requiring another application.

8. The method of claim 1, wherein the first service is selected in accordance with a service history associated with the user.

9. The method of claim 1, wherein the first service is selected in accordance with a subscription plan associated with the user.

10. The method of claim 1, wherein the first service is selected in accordance with a preference associated with the user.

11. The method of claim 1, further comprising:
responsive to a predefined user action:
causing the backup service bundle to be offered to the user by causing the third service and at least a fourth service to be concurrently offered to the user.

12. The method of claim 1, wherein the first service is provided by a first service provider, and the second service is provided by a second provider distinct from the first provider.

13. The method of claim 1, wherein the first service is available in the first geo-fence area, and the third service is available in the second geo-fence area distinct from the first geo-fence area.

14. The method of claim 1, wherein the first service is provided for a first time period, and the second service is provided for a second time period distinct from the first time period.

15. A non-transitory computer readable storage medium storing one or more computer programs, the one or more computer programs comprising instructions, which when executed by a computing system with one or more processors, cause the computing system to execute computer operations comprising:

storing in the memory a plurality of services provided by a plurality of service providers, wherein:

each service provider provides one or more services to customers at a physical establishment or location;

each service provider predefines a geo-fence area comprising a set of boundaries encompassing its physical establishment or location for offering its services; and each service provider defines a time availability for offering its services;

identifying location information associated with a mobile device of a user, the location information comprising a location of the mobile device;

identifying information representing a current time;

detecting, based on the location of the mobile device, movement of the user into a location within a first geo-fence area, and in accordance with (1) a first determination that a first service corresponds to a first physical location within a predefined proximity to the first geo-fence area, (2) a second determination that a second service corresponds to a second physical location within the predefined proximity to the first geo-fence area, (3) a third determination that the first service relates to the second service to a predefined degree, and (4) a fourth determination that the first service and the second service are available based on the information representing the current time;

using a single application, causing a service bundle to be offered to the user in response to the first, second, third and fourth determinations by causing the first service and the second service to be concurrently offered to the user in the single application;

detecting, based on the location of the mobile device, user movement away from the first geo-fence area; and replacing the service bundle with a backup service bundle comprising at least a third service corresponding to a third physical location within a predetermined proximity to a second geo-fence area, wherein at least one of the first or second services is replaced in the backup service bundle.

16. A computing system, comprising:
one or more processors;
memory; and
one or more programs, wherein the one or more programs are stored in the memory and configured to be executed by the one or more processors, the one or more programs including instructions for:

storing in the memory a plurality of services provided by a plurality of service providers, wherein:

each service provider provides one or more services to customers at a physical establishment or location;

each service provider predefines a geo-fence area comprising a set of boundaries encompassing its physical establishment or location for offering its services; and each service provider defines a time availability for offering its services;

identifying location information associated with a mobile device of a user, the location information comprising a location of the mobile device;

identifying information representing a current time;

detecting, based on the location of the mobile device, movement of the user into a location within a first geo-fence area, and in accordance with (1) a first determination that a first service corresponds to a first physical location within a predefined proximity to the first geo-fence area, (2) a second determination that a second service corresponds to a second physical location within the predefined proximity to the first geo-fence area, (3) a third determination that the first service relates to the second service to a predefined degree, and (4) a fourth determination that the first service and the second service are available based on the information representing the current time;

using a single application, causing a service bundle to be offered to the user in response to the first, second, third and fourth determinations by causing the first service and the second service to be concurrently offered to the user in the single application;

detecting, based on the location of the mobile device, user movement away from the first geo-fence area; and replacing the service bundle with a backup service bundle comprising at least a third service corresponding to a third physical location within a predetermined proximity to a second geo-fence area, wherein at least one of the first or second services is replaced in the backup service bundle.

17. The method of claim 1 further comprising determining a parameter associated with the first service in the service bundle based on the second service in the service bundle to avoid offering conflicting options.

18. The method of claim 1 wherein the location of the mobile device of the user is used to determine what services are offered based on the proximity of the mobile device to one or more geo-fences associated with the plurality of services.

* * * * *